US009640305B2

(12) United States Patent
Shoji et al.

(10) Patent No.: US 9,640,305 B2
(45) Date of Patent: May 2, 2017

(54) METHOD FOR PRODUCING SINTERED RARE-EARTH MAGNET, SINTERED RARE-EARTH MAGNET, AND MATERIAL FOR SAME

(75) Inventors: Tetsuya Shoji, Susono (JP); Noritsugu Sakuma, Susono (JP); Hidefumi Kishimoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 896 days.

(21) Appl. No.: 13/511,465

(22) PCT Filed: Nov. 18, 2010

(86) PCT No.: PCT/IB2010/002934
§ 371 (c)(1),
(2), (4) Date: May 23, 2012

(87) PCT Pub. No.: WO2011/064636
PCT Pub. Date: Jun. 3, 2011

(65) Prior Publication Data
US 2013/0092867 A1    Apr. 18, 2013

(30) Foreign Application Priority Data
Nov. 26, 2009  (JP) .................................. 2009-268943

(51) Int. Cl.
*H01F 1/11*      (2006.01)
*H01F 1/057*     (2006.01)
(Continued)

(52) U.S. Cl.
CPC ............. *H01F 1/11* (2013.01); *H01F 1/0572* (2013.01); *H01F 1/0577* (2013.01); *H01F 1/061* (2013.01);
(Continued)

(58) Field of Classification Search
CPC .. B22F 3/10; B22F 9/04; B22F 1/0055; B22F 2009/048; B22F 9/008; H01F 1/0577; H01F 1/0557
See application file for complete search history.

(56) References Cited

U.S. PATENT DOCUMENTS 5,290,425 A * 3/1994 Momotani et al. ........... 205/234
6,010,610 A * 1/2000 Yih .............................. 205/149
(Continued)

FOREIGN PATENT DOCUMENTS

CN        1628182 A       6/2005
EP      1 793 392 A2      6/2007
(Continued)

OTHER PUBLICATIONS

Takezawa, Journal of Magnetism and Magnetic Materials, 2007, vol. 310, p. 2572-2574.*
(Continued)

*Primary Examiner* — Jie Yang
*Assistant Examiner* — Xiaowei Su
(74) *Attorney, Agent, or Firm* — Sughrue Mion, PLLC

(57) ABSTRACT

A method for producing a sintered rare-earth magnet characterized by sintering a raw material that includes a ribbon-shaped polycrystalline phase with an average grain size of 10 to 200 nm fabricated by rapid solidification of an alloy melt having a rare-earth magnet composition, and a low-melting point phase formed on the surface of the polycrystalline phase and having a melting point lower than the polycrystalline phase.

7 Claims, 6 Drawing Sheets

(51) Int. Cl.
*H01F 1/06* (2006.01)
*H01F 1/08* (2006.01)
*H01F 41/02* (2006.01)
*H01F 1/058* (2006.01)
*B82Y 40/00* (2011.01)

(52) U.S. Cl.
CPC ......... *H01F 1/086* (2013.01); *H01F 41/0266* (2013.01); *B82Y 40/00* (2013.01); *H01F 1/058* (2013.01); *Y10S 977/838* (2013.01); *Y10S 977/90* (2013.01)

(56) References Cited

U.S. PATENT DOCUMENTS

| | | |
|---|---|---|
| 2004/0025974 A1 | 2/2004 | Lee et al. |
| 2006/0005898 A1 | 1/2006 | Liu et al. |
| 2006/0016515 A1 | 1/2006 | Tomizawa et al. |
| 2008/0274009 A1* | 11/2008 | Tomizawa ............ C22C 38/005 420/83 |
| 2009/0127494 A1* | 5/2009 | Kanekiyo et al. ......... 252/62.55 |
| 2009/0218012 A1 | 9/2009 | Hioki et al. |

FOREIGN PATENT DOCUMENTS

| | | |
|---|---|---|
| EP | 1 826 782 A1 | 8/2007 |
| JP | 64-055806 A | 3/1989 |
| JP | 07-066021 A | 3/1995 |
| JP | 09-139306 A | 5/1997 |
| JP | 02693601 B2 | 9/1997 |
| JP | 02779830 B2 | 5/1998 |
| JP | 2000-026901 A | 1/2000 |
| JP | 2003-226944 A | 8/2003 |
| JP | 2003-293097 A | 10/2003 |
| JP | 2005-272924 A | 10/2005 |
| JP | 2007-288020 A | 11/2007 |
| JP | 2007-288021 A | 11/2007 |
| JP | 2008-130802 A | 6/2008 |

OTHER PUBLICATIONS

Wecker (Journal of Applied Physics, 1987, vol. 62, p. 990-993).*
International Search Report and Written Opinion for corresponding International Patent Application No. PCT/IB2010/002934 mailed Feb. 16, 2011.
Japanese Office Action for corresponding JP Patent Application No. 2009-268943 issued on Sep. 8, 2011.
Japanese Office Action for corresponding JP Patent Application No. 2009-268943 issued on Jan. 10, 2012.

* cited by examiner

FIG. 7A
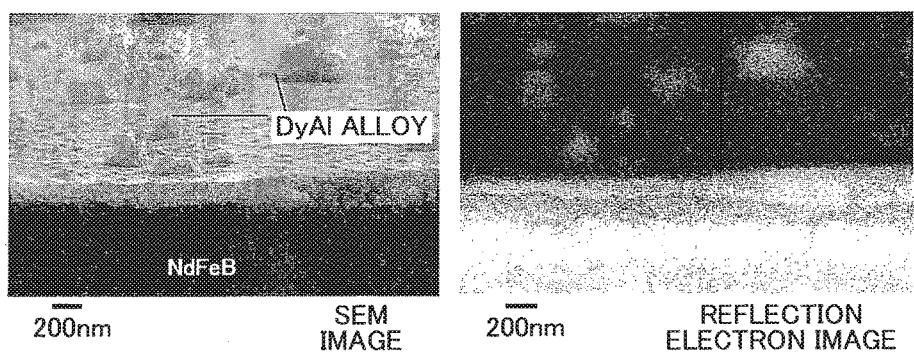
FIG. 7B
FIG. 7C
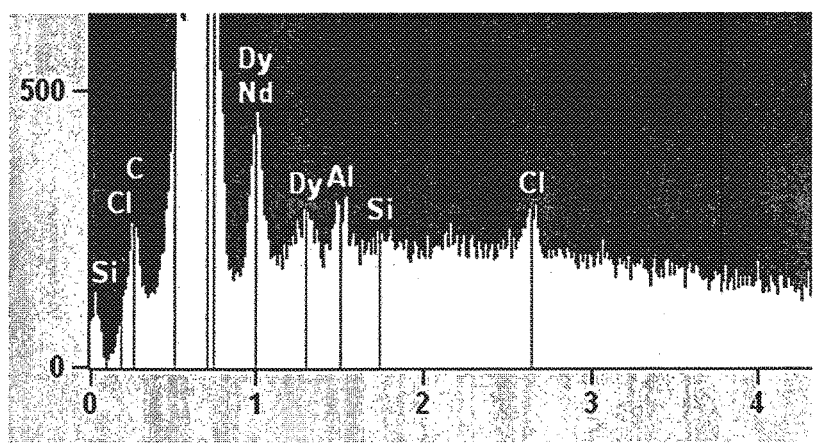

METHOD FOR PRODUCING SINTERED RARE-EARTH MAGNET, SINTERED RARE-EARTH MAGNET, AND MATERIAL FOR SAME

BACKGROUND OF THE INVENTION

1. Field of the Invention

The invention relates to a method for producing a sintered rare-earth magnet that has a polycrystalline phase with nanosized crystal grains, a sintered rare-earth magnet, and a material for the same.

2. Description of the Related Art

Rare earth magnets typified by neodymium magnets ($Nd_2Fe_{14}B$) have a high flux density and are used in a variety of applications as extremely powerful permanent magnets. To obtain even better magnetic properties a rare earth magnet with nanosized crystal grains is required.

The following process is available as a typical process for producing a rare-earth magnet by sintering:

1) An alloy melt that has the composition of the rare earth magnet is rapidly solidified and formed into a ribbon (rapidly quenched ribbon) using a single-roll process, double-roll process, etc.; and
2) The ribbon is pulverized into a powder, and the powder is made into a bulk unit by a sintering process such as pressure sintering.

During rapid solidification in the process of 1) above, however, if an amorphous phase is produced in the rapidly quenched ribbon that is formed thereby, sintering in the process of 2) above also serving as a heat treatment at 600° C. or higher must be performed to crystallize the amorphous phase, and that process causes coarsening of the nanostructure.

Japanese Patent Application Publication No. 09-139306 (JP-A-09-139306) discloses performing sintering by a hot press at the high temperature of 800° C. using powder obtained by pulverizing a rapidly quenched ribbon that has been prepared by the single-roll process as a process for producing a sintered rare-earth magnet. In general, an amorphous phase is produced when rapid quenching is carried out, so the aforementioned kind of high-temperature sintering is carried out to crystallize the entire bulk unit. Coarsening of the crystal grain size is expected as a result.

To enable low-temperature sintering, one solution is to coat the rapidly quenched ribbon with a low-melting point phase with a melting point lower than the ribbon body. Since a low-temperature phase is present on the surface of a powder obtained by pulverizing the rapidly quenched ribbon, a liquid phase will be present on the surface of the powder particles at the time of sintering, and this will enable sintering at a lower temperature.

Japanese Patent No. 02693601 discloses performing rapid quenching by a double-roll process. But with the double-roll process the low melting point phase will formed in the interior of the rapidly quenched ribbon rather than on the surface thereof.

Japanese Patent Application Publication No. 2007-288020 (JP-A-2007-288020) and Japanese Patent Application Publication No. 2007-288021 (JP-A-2007-288021), respectively, disclose coating a rare-earth magnet with Dy (dysprosium) using electrodeposition, or dissolving dysprosium chloride in an organic solvent and using the same. With these methods the dysprosium deposition layer has a thickness of several micrometers and is as thick as the rapidly quenched ribbon. These methods are effective for producing a rare-earth magnet containing dysprosium though internal diffusion of the dysprosium, but these processes cannot produce the thickness of several nanometers that is suitable as a low-melting point phase for rare-earth magnets in general with different compositions. In other words, to form an electrodeposition layer with submicron or even nanosized thickness, it is necessary to perform electrodeposition at a low current and a low metal ion concentration, but rare-earth magnets typified by Nd (Neodymium) and dysprosium have a low reduction potential, so they dissolve in water that is dissolved in the solvent, and it is impossible to perform electrodeposition thereby.

JP-A-2007-288021 also discloses using an ionic solvent as a molten salt, but in this technique it is possible that the crystal grains will be coarsened by the heat of the molten salt, so forming a low temperature phase thereby is essentially impossible.

Japanese Patent No. 02779830 discloses using an anhydrous organic solvent as a surface plating solution for a rare-earth magnet, but it does not disclose information contributing to electrodeposition of a low temperature phase.

In summary, none of the above documents discloses or suggests information that will enable low-temperature sintering to achieve nanosized crystal grains.

SUMMARY OF THE INVENTION

The invention provides a process for producing a sintered rare-earth magnet that enables sintering at a low temperature to acquire nanosized crystal grains, a sintered rare-earth magnet, and a material for the same.

A first aspect of the invention relates to a method for producing a sintered rare-earth magnet that includes: preparing a ribbon composed of a polycrystalline phase including crystal grains with an average grain size of 10 to 200 nm by rapidly solidificating of an alloy melt having a rare-earth magnet composition; forming a low-melting point phase having a melting point lower than the polycrystalline phase on the surface of the ribbon; and sintering a raw material composed of the ribbon and the low-melting point phase. With this configuration the alloy melt with the rare-earth magnet composition is rapidly solidified to become a nanosized, ribbon-shaped polycrystalline phase having an average crystal grain size of 10 to 200 nm, a low-melting point phase with a melting point lower than the polycrystalline phase is formed on the surface thereof, and sintering is carried out using the same as a raw material. Therefore, sintering can proceed at a temperature lower than the melting point of the polycrystalline phase, so coarsening of the polycrystalline phase can be inhibited, and nanosized crystal grains can be retained thereby.

In the method of this aspect, the rapid solidification of the alloy melt may be carried out by a single-roll process in which a single roll is used, and the surface of the ribbon on which the low-melting point phase is formed may be opposite to a surface in contact with the single roll.

The low-melting point phase may be formed on one or both surfaces of the ribbon by an electrodeposition.

In the method of this aspect, the electrodeposition may be carried out using an organic solvent or an ionic liquid as an electrolyte liquid.

In the method of this aspect, the average grain size of the crystal grains contained in the polycrystalline phase may be 10 to 50 nm.

In the method of this aspect, the sintering of the raw material may include pulverizing the raw material to obtain a powder and then sintering that powder.

A second aspect of the invention relates to a sintered rare-earth magnet produced by a method that includes: preparing a ribbon composed of a polycrystalline phase including crystal grains with an average grain size of 10 to 200 nm by rapidly solidificating of an alloy melt having a rare-earth magnet composition; forming a low-melting point phase having a melting point lower than the polycrystalline phase on the surface of the ribbon; and sintering a raw material composed of the ribbon and the low-melting point phase.

A third aspect of the invention relates to a sintered rare-earth magnet raw material that includes a ribbon composed of a polycrystalline phase including crystal grains with an average grain size of 10 to 200 nm, and a low-melting point phase formed on the surface of the ribbon and having a melting point lower than the polycrystalline phase.

In the raw material of this aspect, the average grain size of the crystal grains contained in the polycrystalline phase may be 10 to 50 nm.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 7A to 7C are photos showing SEM images and BSE images of the deposit on the ribbon surface and a chart showing the EDX spectrum.

DETAILED DESCRIPTION OF EMBODIMENTS

Figure 1A:
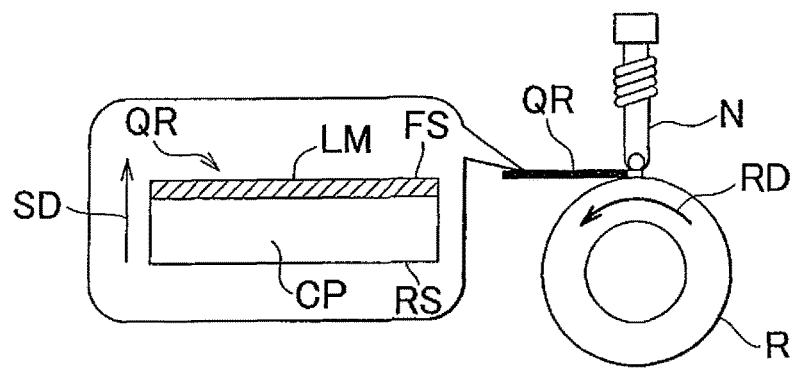
FIGS. 1A and 1B are schematic diagrams showing the relationship between the direction of solidification in the single-roll process and double-roll process, respectively, and the location at which the low-melting point phase is formed.

One embodiment of the invention is described in detail below.

The compositional formula of the sintered rare-earth magnet produced by the production process of the embodiment is $R_aJ_bFe_cCo_dB_eM_f$, wherein R represents at least one element among the rare earth elements including Y (yttrium); J represents at least one element among the heavy rare earth elements including Dy (dysprosium) and Tb (terbium); M represents at least one element selected from the group consisting of Ga (gallium), Zn (zinc), Si (silicon), Al (aluminum), Nb (niobium), Zr (zirconium), Ni (nickel), Cu (copper), Cr (chromium), Hf (hafnium), Mo (molybdenum), P (phosphorus), C (carbon) and Mg (magnesium); a represents a number between 13 and 20; b represents a number between 0 and 4; c represents a number obtained by subtracting a, b, d, e, and f from 100; d represents a number between 0 and 30; e represents a number between 4 and 20; and f represents a number between 0 and 3. The sintered rare-earth magnet in this embodiment contains each of the above elements as alloy components, and it also contains unavoidable impurities that are unavoidably included due to the raw material and production process. The content of unavoidable impurities should be limited as much as possible so they do not substantially affect the properties of the sintered rare-earth magnet produced by the production process of this embodiment, or the production process itself.

The sintered rare-earth magnet produced by the production process in this embodiment essentially consists of a main phase including the polycrystalline phase and a grain boundary phase formed at the boundaries of the crystal grains.

In such a case, the compositional formula of the main phase is $(RJ)_2(FeCo)_{14}B$, and the compositional formula of the grain boundary phase includes a phase with a compositional formula of $(RJ)(FeCo)_4B_4$ and a phase with a compositional formula of RJ.

In this embodiment fabrication of the ribbon by rapid solidification is carried out in the following manner.

The cooling rate in rapid quenching is set to a range that is large enough to form a polycrystalline phase containing nanosized crystal grains, but not so large as to form an amorphous phase. The reason is because when an amorphous phase is formed in a ribbon, a heat treatment is then needed to crystallize that phase, and the crystal grains can become course during that process.

In this case, the term nanosized crystal grains refers to crystal grains of 10 nm to 200 nm, and preferably 10 nm to 50 nm, which is less than the signal magnetic domain particle size.

The low-melting point phase constitutes a material that has a melting point lower than the crystalline phase and that does not affect the properties of the sintered rare-earth magnet as a magnet.

The reason for forming the low-temperature phase is as follows: when a powder is obtained by pulverizing the raw material containing the polycrystalline phase and the low-melting point phase, and that powder is sintered, a liquid phase is formed by the low-melting point phase at a lower temperature than when sintering is carried out on the powder of a raw material consisting only of the polycrystalline phase, and as a result, sintering can proceed at a low temperature. Therefore, the low-melting point phase must be present on the surface of the quenched ribbon that constitutes the raw material for sintering.

The thickness of the low-melting point phase can be about 50 nm to 1000 nm, and can be within about 3% by volume fraction of the polycrystalline phase forming the base. If the ratio of the low-melting point phase is too high, the magnetic properties of the magnet obtained by sintering will be profoundly diminished.

Methods for forming the low-melting point phase include: (1) methods utilizing segregation during the rapid solidification process and (2) methods wherein the low-melting point phase is formed after the quenched ribbon is formed.

First a method utilizing segregation during the rapid solidification process will be described. Among the single-roll and double-roll processes available as methods for performing rapid solidification, in this embodiment a single-roll process is used to form the low-melting point phase on the surface of the quenched ribbon. Therefore, during the quenching process solidification proceeds from the surface of the quenched ribbon in contact with the roll toward the free surface, and segregation via a composition wherein the free surface that is the final solidification site has the lowest melting point is utilized. Such means is described in greater detail in Example 1 below.

Next, a method wherein the low-melting point phase is formed after the quenched ribbon is formed will be described. A low-melting point phase can be formed on one or both surfaces of a quenched ribbon prepared by rapid solidification by using electrodeposition, sputtering, cold spray deposition, chemical reduction, and the like. The electrodeposition method is described in greater detail in Example 2 below.

In the case of method (1), the composition of the sintered rare-earth magnet to be produced limits the composition of the low-melting point phase to the composition that is the final part to solidify during rapid solidification. Conversely, in the case of method (2), a diversity of compositions can be used without limitations by the composition of the sintered rare-earth magnet.

When a sintered rare-earth magnet having a composition expressed by the compositional formula $Nd_2Fe_{14}B$ is produced, a low-melting point phase with a melting point lower than the 1155° C. of the $Nd_2Fe_{14}B$ crystalline phase of the quenched ribbon is described below.

The low-melting point phase formed in method (1) is a final solidification phase wherein the Nd phase (melting point 1021° C.) or Nd is segregated at a high concentration.

A low-melting point phase formed in method (2) can be Nd, but can also be NdGa (651° C.), DyCu (790° C.), DyAl (636° C.), Cu (1085° C.), Al (660° C.), Zn (420° C.), NdCu (520° C.), NdAl (635° C.), NdNi (690° C.), or NdFe (640° C.). The numbers inside the parentheses above are the respective melting points. This low-melting point phase can constitute an elemental metal, an alloy, or eutectic compound provided it does not affect the magnetic properties of the sintered rare-earth magnet.

An organic solvent or ionic liquid can be used for the electrolyte liquid for electrodeposition in method (2), and in the case of the reduction and deposition of a rare-earth element, a solvent that can withstand the reduction potential, i.e., a solvent that is not decomposed by the reduction potential, can be used. Table 1 shows examples of such electrolyte liquids.

TABLE 1

| Type | Name | Structural Formula |
|---|---|---|
| Cyclic carbonate | Ethylene carbonate (EC) | |
| | Propylene carbonate (PC) | |
| | Butylene carbonate (BC) | |

TABLE 1-continued

| Type | Name | Structural Formula |
|---|---|---|
| Linear carbonate | Dimethyl carbonate (DMC) | |
| | Ethylmethyl carbonate (EMC) | |
| | Diethyl carbonate (DEC) | |
| Cyclic ether | Tetrahydrofuran (THF) | |
| | 1,3-dioxolane (DOXL) | |
| Linear ether | 1,2-dimethoxy ethane (DME) | |
| | 1,2-diethoxy ethane (DEE) | |
| Cyclic ester | γ-butryolactone (GBL) | |
| Linear ester | Methyl acetate (MA) | |

If water is contained in the electrolyte liquid used for electrodeposition, when one attempts to reduce elements with a lower potential than the decomposition potential of water, the water will preferentially decompose. Therefore, electrodeposition cannot be carried out at a dilute metal ion concentration. To prevent this decomposition from happening the concentration of water should be set at no more than 100 ppm, and preferably no more than 50 ppm after removal of water from the electrolyte liquid by a molecular sieve process, etc. By so doing the decomposition of water can be kept to a minimum. To avoid dissolution of atmospheric water vapor into the electrolyte liquid, electrodeposition is carried out in an, inert atmosphere. Electrodeposition can be carried out in an atmosphere having both an oxygen concentration and a hydrogen concentration of no more than 1 ppm.

It has been almost impossible to form a low-melting point phase with a film thickness of 1 μm or less with related-art electrodeposition methods, but by adjusting the metal ion concentration, current, and deposition time in the electrodeposition method described above, it is possible to form a low-melting point phase with a film thickness of 1 μm or less, and preferably a nano-order thickness. Thereby it is possible to form a low-melting point phase having the aforementioned desired thickness (50 nm to 1000 nm) or the desired volume fraction (no more than 3 vol % of the polycrystalline phase) on, the surface of the quenched ribbon, which is a sliver several micrometers in thickness.

Furthermore, in accordance with this embodiment crystallization of an amorphous phase is unnecessary because the rapidly quenched ribbon that forms the raw material for sintering is a crystalline substance. Therefore, high-temperature sintering carried out at 600° C. or higher together with a heat treatment for crystallization is also unnecessary.

Sintering can be carried out by pressure sintering, and the applied pressure at that time can be 40 MPa to 300 MPa.

The rate of temperature increase until the start of sintering can be great enough to prevent coarsening of the crystal grains, and can be 20° C./min or higher.

Examples of this Embodiment are Described Below.

A rapidly quenched ribbon was prepared by the single-roll process as Example 1. A rapidly quenched ribbon was prepared by the double-roll process as a comparative example. The single-roll process and double-roll process will now be described in detail.

Figure 1B:
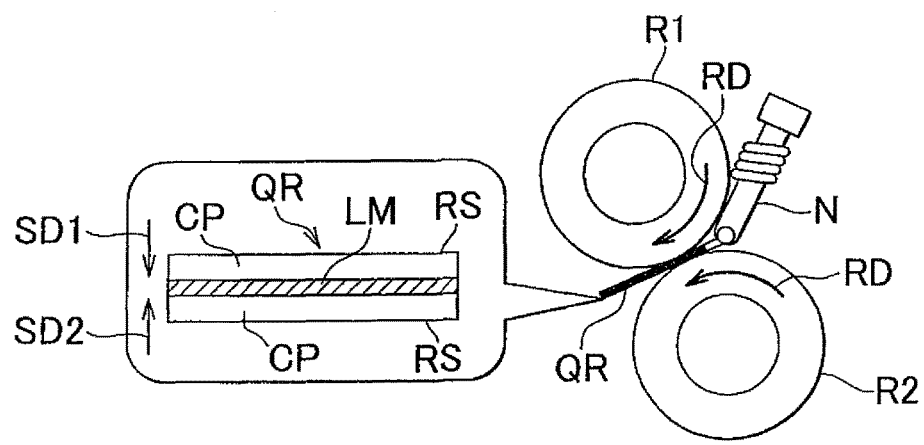

FIGS. 1A and 1B schematically show the relationship between the direction of solidification and the site of formation of the low-melting point phase in the single-roll and double-roll processes. The boxes in FIGS. 1A and 1B are enlarged drawings of a partial cross-section of the rapidly quenched ribbon.

In the single-roll process of FIG. 1A, when the alloy melt is discharged from the melt nozzle N to the outer circumference of the single roll R, the melt is rapidly cooled by the roll R starting on one side and solidifies. It then is ejected from the outer circumference of the single roll R along rotational direction RD of the roll as a quenched ribbon QR. As shown in the enlarged portion, the solidification direction SD from the roll R runs from the roll surface RS that is in contact with the roll toward the free surface FS that is not in contact with the roll, and solidification proceeds along the SD direction. As a result the free surface FS becomes the final solidification site, and that becomes the composition with the lowest melting point in the cross-section. In other words, in such a rapid solidification process segregation occurs along the direction of thickness of the quenched ribbon QR, and a low-melting point phase LM is formed on one side of the crystalline phase CP. Thus, when rapid solidification is carried out by a single-roll process, a low-melting point phase is formed on one side of the rapidly quenched ribbon that serves as the raw material for sintering.

As a result, low-temperature sintering of the pulverized rapidly quenched ribbon can be carried out.

In the double-roll process of FIG. 1B, when the melt is discharged from the melt nozzle N between the outer circumferences of the pair of rolls R1 and R2, the melt is solidified on both sides by rolls R1 and R2, and is ejected from between the rolls along the rotational direction RD of the rolls as a rapidly quenched ribbon QR. As shown in the enlarged portion, the solidification direction SD1 and SD2 from the pair of rolls R1 and R2 runs toward the center of the thickness of the quenched ribbon QR from the roll surfaces RS on both sides that are in contact with the pair of rolls R1 and R2, respectively, and solidification proceeds toward the center of the thickness from both surfaces of the quenched ribbon QR. As a result, the thickness center of the quenched ribbon QR becomes the final solidification site, and it becomes the composition with the lowest melting point in the cross-section. Therefore, it is impossible to form a low-melting point phase with rapid solidification using a double roll. For this reason it is almost impossible to carry out low-temperature sintering of the pulverized rapidly quenched ribbon.

Under the conditions shown in Table 2, a rapidly quenched ribbon with the composition $Nd_{15}Fe_{70}B_{14}Ga$ was fabricated by the single-roll process, and a rapidly quenched ribbon with the composition $Nd_{12}Fe_{81}B_6Nb$ was fabricated by the double-roll process by the methods of FIGS. 1A and 1B, respectively. Table 2

| Nozzle diameter | 0.6 mm |
| --- | --- |
| Clearance | 0.7 mm |
| Spray pressure | 0.4 kg/cm$^3$ |
| Roll speed | 2350 rpm |
| Melting temperature | 1450° C. |

Figure 2:
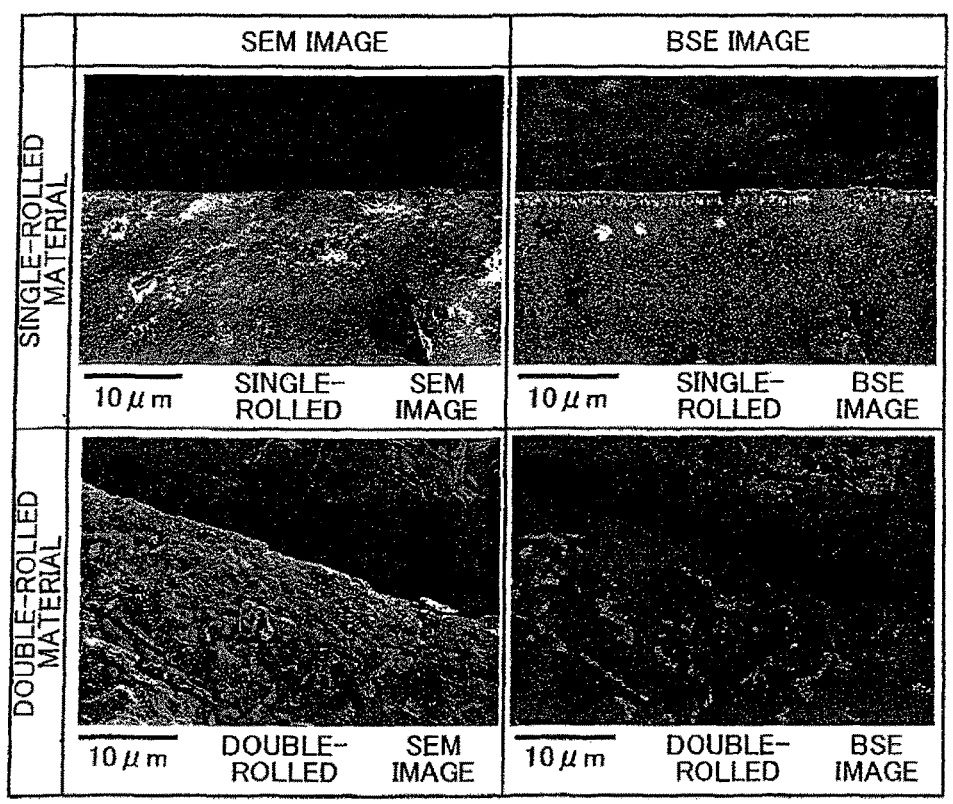
FIG. 2 are photos showing scanning electron microscope (SEM) images and back scattering electron (BSE) images of the fracture cross-sections of single-rolled and double-rolled materials.

Each fabricated rapidly quenched ribbon was fractured in liquid nitrogen, and the fractured surface was observed by SEM. FIG. 2 shows SEM and BSE images.

As shown in the BSE image, an Nd-rich, low-melting point phase (white spots aligned in parallel) is present directly below the surface on the side of the free surface (top surface in the figure) of the rapidly quenched ribbon fabricated by the single-roll process. Whereas the melting point of the main phase $Nd_2Fe_{14}BNd$ is 1155° C., the melting point of Nd is 1021° C., and the melting point of NdGa is 651° C. In contrast, in the material fabricated by the double-roll process an Nd-rich, low-melting point phase (white spots) is present near the center of the fracture surface of the rapidly quenched ribbon. In other words, as noted above by reference to FIG. 1, the low-melting point phase (Nd-rich phase) is formed on one surface (free surface) of the rapidly quenched ribbon by the single-roll process, but the low-melting point phase (Nd-rich phase) is formed in the center of the rapidly quenched ribbon by the double-roll process.

Figure 3:
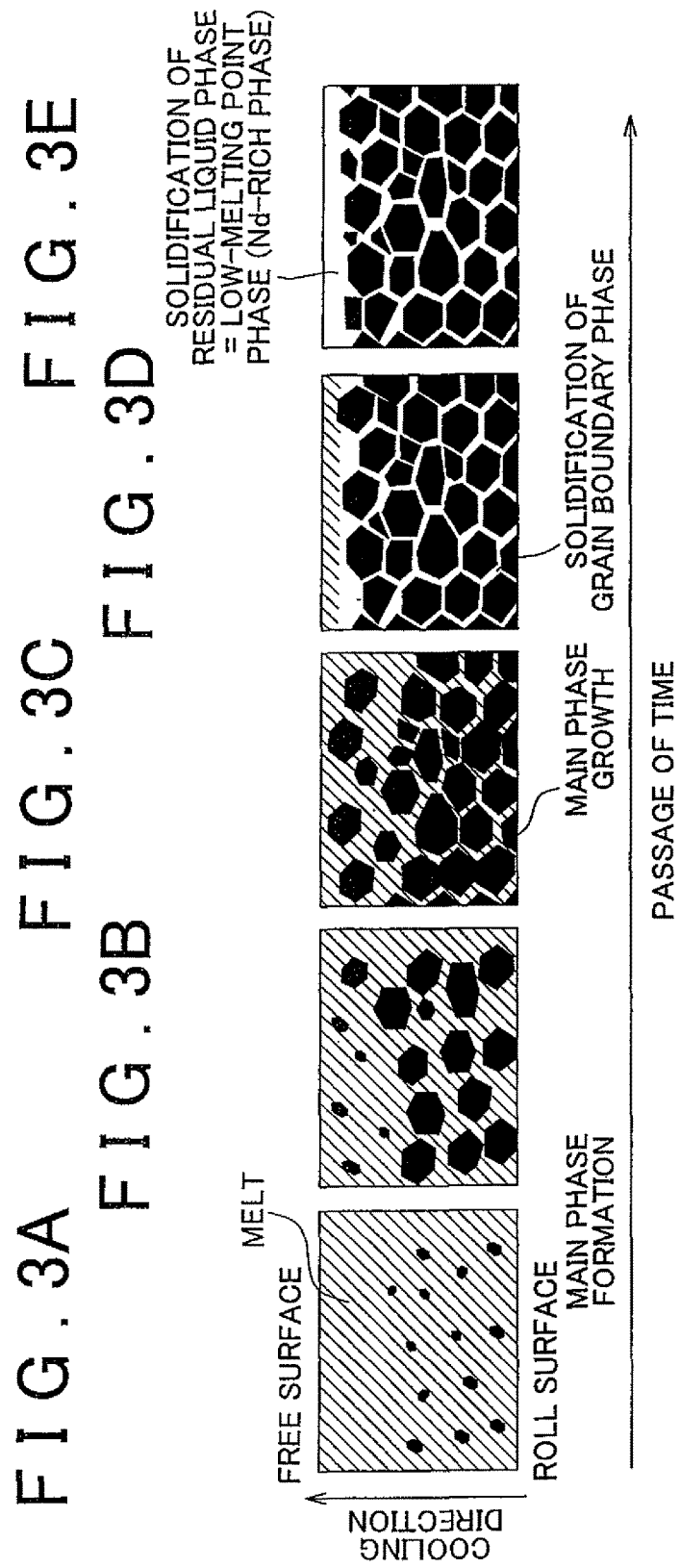
FIGS. 3A to 3E are schematic diagrams showing the progress of rapid solidification within the quenched ribbon in the single-roll process.

FIGS. 3A to 3E schematically show the progression of rapid solidification within the rapidly quenched ribbon in the single-roll process. Proceeding from FIGS. 3A to 3E, the state is shown wherein solidification within the fracture surface progresses with the passage of time from the roll surface toward the free surface of the rapidly quenched ribbon. The direction of cooling (direction of solidification) as shown at the left end is the direction from the bottom edge of the figure (roll surface) toward the top edge (free surface). In other words, immediately after the alloy melt comes in contact with the outer circumferential surface of the single roll, the crystalline phase (main phase) begins to nucleate within the melt as shown in FIG. 3A; the crystalline phase (main phase) gradually grows in stages as shown in FIGS. 3B to 3C; the grain boundary phase forms at the stage shown in FIG. 3D to form a polycrystalline phase, and the melt (molten liquid) portion remains only on the side of the free surface; and the molten liquid on the side of the free surface finally solidifies at the stage shown in FIG. 3E to become the low-melting point phase (Nd-rich phase).

Next, spark plasma sintering (SPS) was carried out using powder obtained by pulverizing the rapidly quenched ribbon fabricated by the single-roll process in Example 1 (single-rolled material) and powder obtained by pulverizing the rapidly quenched ribbon prepared by the double-roll process in the comparative example (double-rolled material). The sintering conditions were as follows: vacuum atmosphere pressure $10^{-2}$ Pa, pressurizing pressure 100 MPa, and rate of temperature increase 60° C./min.

Figure 4:
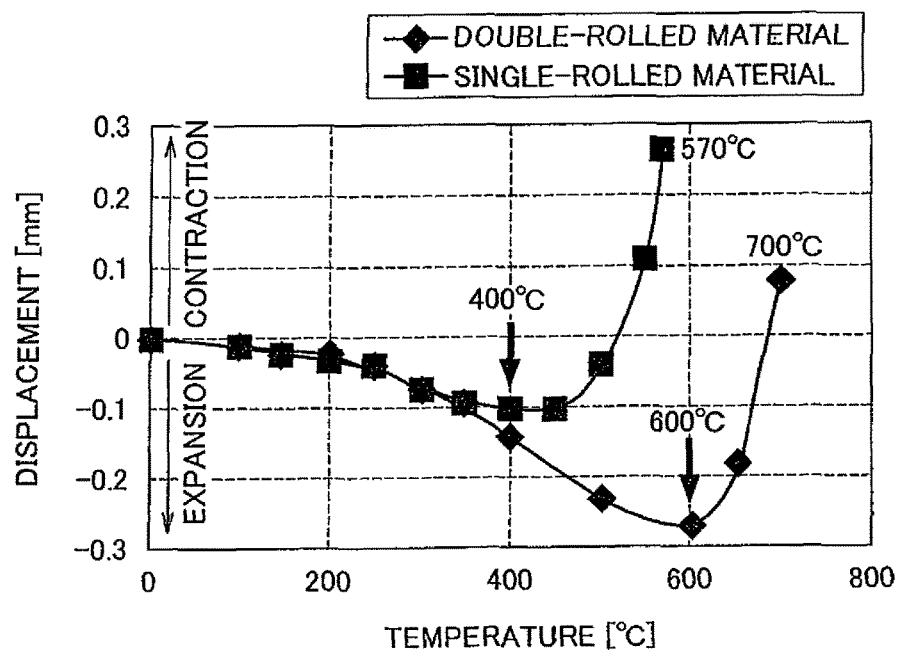
FIG. 4 is a graph comparing changes in temperature and displacement in the sintering process of single-rolled and double-rolled materials.

FIG. 4 shows a comparison of changes in temperature and displacement during the respective sintering processes of the single-rolled material and the double-rolled material. For displacement values (vertical axis of the graph), downward displacement corresponds to expansion and upward displacement corresponds to contraction.

As shown in the graph, both materials gradually undergo thermal expansion from the start of heating as the temperature rises, and at a predetermined temperature (represented in the graph by "↓") they switch over to contraction as a result of the start of sintering. The contraction ends as sintering is completed.

Therefore, from FIG. 4 it is clear that with the double-rolled material of the comparative example, the temperature at the start of sintering is 600° C. and the temperature at the completion of sintering is 700° C. In contrast, with the single-rolled material of Example 1, it is clear that the temperature at the start of sintering is 400° C. and the temperature at the end of sintering is 570° C. In other words, by fabricating the rapidly quenched ribbon with the single-roll process of Example 1, the temperature at the start of sintering is lowered by 200° C. compared with the double-roll process, from 600° C. to 400° C. In addition, the temperature at the end of sintering is markedly decreased to 570° C. with the single-roll process in contrast to 700° C. with the double-roll process, and thereby it becomes possible to acquire the requisite temperature for a flux density of 95% or greater in a magnet obtained by sintering.

With respect to crystal grain size after the completion of sintering, the average crystal grain size was 51 nm in the sample sintered from the single-rolled material, and coarsening of the crystal grain size was prevented. In contrast, the average grain size was 93 nm in the sample sintered from the double-rolled material of the comparative example, and pronounced coarsening was found.

Example 2 will be described below. In the same manner as in Example 1, a rapidly quenched ribbon with a composition of $Nd_{15}Fe_{77}B_8$ was fabricated by the single-roll process. Using the electrodeposition device shown in FIG. 5, a low-melting point phase consisting of AlDy alloy was formed the surface thereof.

Ethylene carbonate (EC) and diethyl carbonate (DEC) were mixed (EC:DEC) and used as the electrolyte liquid (solvent). $AlCl_3$ was dissolved to a concentration of 0.02 mol/L and $DyCl_3$ was dissolved to a concentration of 0.02 mol/L as the respective Al and Dy salts for electrodeposition.

Figure 5:
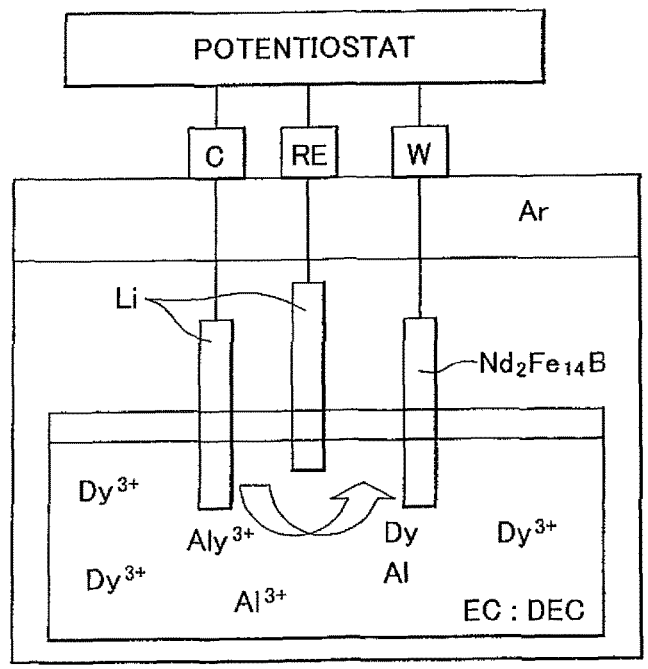
FIG. 5 is a schematic diagram of the electro deposition apparatus.
Figure 6A:
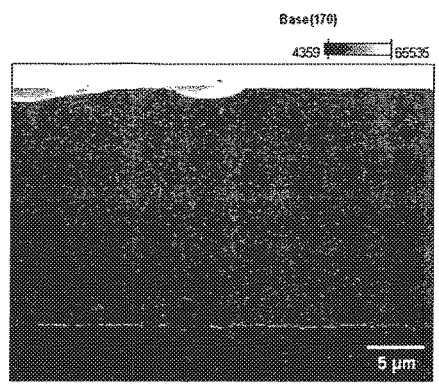
FIGS. 6A to 6E are photos showing the elemental mapping results of the ribbon fracture surface by scanning electron microscope-energy dispersive X-ray analysis (SEM-EDX)
Figure 6B:
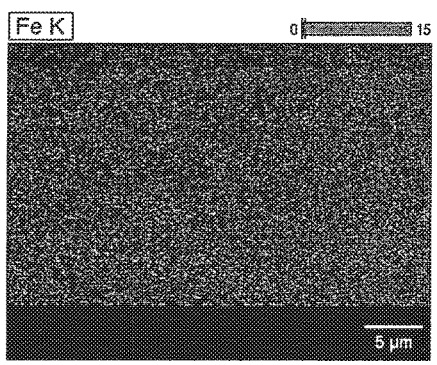
Figure 6C:
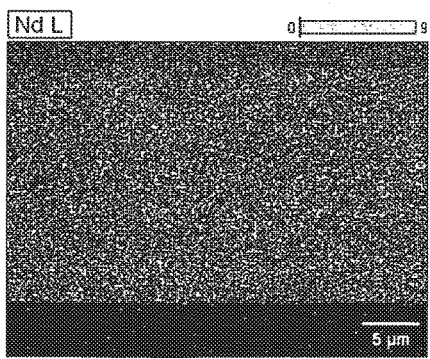
Figure 6D:
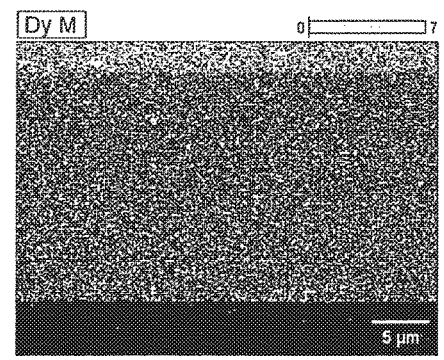
Figure 6E:
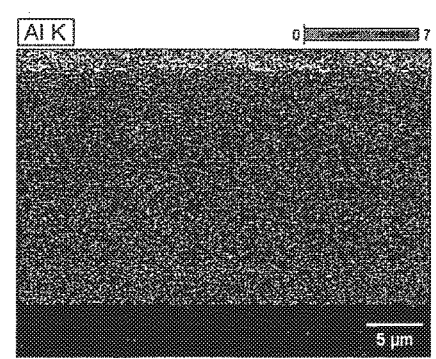

As shown in FIG. 5, under extremely low oxygen conditions the rapidly quenched $Nd_{15}Fe_{77}B_8$ ribbon was mounted at the working electrode W of the electrodeposition device.

To prevent the formation of oxides and hydroxides resulting from the reaction of oxygen and water in the Dy used as the electrolyte and on the lithium foil used for the counter electrode C and the reference electrode RE, the mixing of reagents was performed in a glove box, and the measurement of the current-potential curve was performed in a glass desiccator filled with Ar.

After electrodeposition for 4 h at a voltage of +1.2 V, electrodeposition was carried out for 4 h at a voltage of +0.4 V, and Al and Dy were deposited on the surface of the rapidly quenched $Nd_{15}Fe_{77}B_8$ ribbon.

After the resulting ribbon was rinsed in ethanol, the matrix was observed by SEM-EDX.

FIGS. 6A to 6E and FIGS. 7A to 7C show the observation results.

FIGS. 6A to 6E show the elemental mapping results by SEM-EDX of the ribbon fracture surface, and it can be confirmed that AL-Dy is concentrated on the surface of the rapidly quenched ribbon. FIGS. 7A to 7C show the precipitate on the ribbon surface and the EDX spectrum, and the simultaneous detection of Al and Dy confirms that an AlDy alloy was formed. The film thickness was 200 nm to 300 nm.

Just as in Example 1, the AlDy phase (melting point 636° C.) acted as a low-melting point phase in contrast to the $Nd_2Fe_{14}B$ phase (melting point 1155° C.) in the polycrystalline phase $Nd_{15}Fe_{77}B_8$ of the rapidly quenched ribbon, and thereby enabled low-temperature sintering of the rare-earth magnet and prevention of coarsening of the crystal grains of $Nd_{15}Fe_{77}B_8$ in the polycrystalline phase.

The composition of sintered rare-earth magnets produced by the production process of this invention is not limited to the compositions in the above embodiment.

The invention provides a process for producing a sintered rare-earth magnet that enables sintering at a low temperature to acquire nanosized crystal grains.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

What is claimed is:

1. A method for producing a sintered rare-earth magnet comprising:
   preparing a ribbon comprising a polycrystalline phase including crystal grains with an average grain size of 10 to 200 nm by rapidly solidifying an alloy melt having a rare-earth magnet composition;
   forming a low-melting point phase having a melting point lower than the polycrystalline phase on a surface of the ribbon; and
   sintering a raw material comprising the ribbon and the low-melting point phase,
   wherein the rapidly solidifying the alloy melt is performed by a single-roll process in which a single roll is used, and the surface of the ribbon on which the low-melting point phase is formed is opposite to a surface in contact with the single roll,
   the low-melting point phase is not more than 3% by volume fraction of the polycrystalline phase, and
   a thickness of the low-melting point phase is 50 nm to 1000 nm.

2. The method according to claim 1, wherein the average grain size of the crystal grains contained in the polycrystalline phase is 10 to 50 nm.

3. The method according to claim 1, wherein the sintering of the raw material includes pulverizing the raw material to obtain a powder, and sintering the powder.

4. The method according to claim 1, wherein, immediately after the alloy melt comes in contact with an outer circumferential surface of the single roll, a main crystalline phase begins to nucleate within the alloy melt and the crystalline phase gradually grows in stages; then a grain boundary phase forms to form a polycrystalline phase, and a melt portion remains only on the side of the free surface; and finally the melt portion on the side of the free surface solidifies to become the low-melting point phase.

5. The method according to claim 1, wherein the low-melting point phase is a final solidification phase.

6. A raw material for a sintered rare-earth magnet comprising:
   a ribbon comprising a polycrystalline phase including crystal grains with an average grain size of 10 to 200 nm; and
   a low-melting point phase formed on a surface of the ribbon and having a melting point lower than the polycrystalline phase, wherein the ribbon is prepared by rapidly solidifying an alloy melt having a rare earth magnet composition by a single-roll process in which a single roll is used, and the surface of the ribbon on which the low-melting point phase is formed is opposite to a surface in contact with the single roll, the low-melting point phase is not more than 3% by volume fraction of the polycrystalline phase, and a thickness of the low-melting point phase is 50 nm to 1000 nm.

7. The raw material according to claim 6, wherein the average grain size of the crystal grains contained in the polycrystalline phase is 10 to 50 nm.

* * * * *